US009181380B2

(12) United States Patent
Panther

(10) Patent No.: US 9,181,380 B2
(45) Date of Patent: Nov. 10, 2015

(54) THERMOSETTING RESIN COMPOSITION

(76) Inventor: Richard Austin Panther, Kettering (GB)

( * ) Notice: Subject to any disclaimer, the term of this patent is extended or adjusted under 35 U.S.C. 154(b) by 1370 days.

(21) Appl. No.: 12/593,910

(22) PCT Filed: Mar. 31, 2008

(86) PCT No.: PCT/GB2008/001120
§ 371 (c)(1),
(2), (4) Date: Sep. 29, 2009

(87) PCT Pub. No.: WO2008/119973
PCT Pub. Date: Oct. 9, 2008

(65) Prior Publication Data
US 2010/0130675 A1     May 27, 2010

(30) Foreign Application Priority Data
Mar. 30, 2007   (GB) .................................. 0706309.2

(51) Int. Cl.
| C08F 283/00 | (2006.01) |
| C08F 290/06 | (2006.01) |
| C08F 290/14 | (2006.01) |
| C08G 18/67 | (2006.01) |
| C08G 18/78 | (2006.01) |
| C08G 18/79 | (2006.01) |
| C08J 5/04 | (2006.01) |

(52) U.S. Cl.
CPC ........... *C08F 290/06* (2013.01); *C08F 283/006* (2013.01); *C08F 290/061* (2013.01); *C08F 290/067* (2013.01); *C08F 290/14* (2013.01); *C08G 18/673* (2013.01); *C08G 18/7831* (2013.01); *C08G 18/792* (2013.01); *C08G 18/798* (2013.01); *C08J 5/043* (2013.01)

(58) Field of Classification Search
CPC ............... C08F 283/006; C08F 290/06; C08F 290/061; C08F 290/067; C08F 290/14; C08J 5/043; C08G 18/673; C08G 18/7831; C08G 18/792; C08G 18/798
USPC ........................................................ 524/543
See application file for complete search history.

(56) References Cited

U.S. PATENT DOCUMENTS

| 4,393,177 | A | | 7/1983 | Ishii et al. |
| 5,451,695 | A | * | 9/1995 | Kawasaki et al. ............... 560/33 |
| 5,777,024 | A | | 7/1998 | Killilea et al. |
| 5,863,997 | A | | 1/1999 | Smith |
| 5,874,041 | A | | 2/1999 | Matsumura et al. |
| 6,509,086 | B1 | | 1/2003 | Schroder et al. |
| 6,559,260 | B1 | | 5/2003 | Fan et al. |
| 2002/0164434 | A1 | | 11/2002 | Tarvin et al. |
| 2002/0173593 | A1 | | 11/2002 | Udding et al. |
| 2004/0091632 | A1 | | 5/2004 | Matsunami et al. |
| 2004/0138328 | A1 | * | 7/2004 | Kohr et al. .................. 522/149 |
| 2004/0235977 | A1 | | 11/2004 | Bulluck et al. |
| 2005/0171231 | A1 | * | 8/2005 | Diggins ....................... 523/105 |
| 2005/0238824 | A1 | | 10/2005 | Ogonowski et al. |
| 2005/0238883 | A1 | | 10/2005 | Peeler et al. |
| 2005/0238884 | A1 | | 10/2005 | Peters et al. |
| 2005/0239955 | A1 | | 10/2005 | Kielbasa et al. |
| 2005/0239991 | A1 | | 10/2005 | Peters et al. |
| 2006/0047099 | A1 | | 3/2006 | Flosbach et al. |
| 2006/0051590 | A1 | | 3/2006 | Peters et al. |
| 2006/0051593 | A1 | | 3/2006 | Peeler et al. |
| 2006/0052524 | A1 | | 3/2006 | Peters et al. |

FOREIGN PATENT DOCUMENTS

| EP | 0526123 | B1 | 12/1996 |
| EP | 1591491 | A1 | 11/2005 |
| GB | 1215591 | | 12/1970 |
| GB | 1304858 | | 1/1973 |
| GB | 2304122 | A | 3/1997 |
| JP | 60-231719 | | 11/1985 |
| JP | 62-226145 | | 10/1987 |
| JP | 01-209401 | | 8/1989 |
| JP | 02-308201 | | 12/1990 |
| JP | 06/234823 | | 8/1994 |
| JP | 08-193109 | | 7/1996 |
| JP | 08-231655 | | 9/1996 |
| JP | 2004-010771 | | 1/2004 |
| JP | 2004-083745 | | 3/2004 |
| JP | 2004-137439 | | 5/2004 |
| WO | 97/38020 | A1 | 10/1997 |
| WO | 98/11142 | A1 | 3/1998 |
| WO | 01/72862 | A2 | 10/2001 |
| WO | 03/052011 | A1 | 6/2003 |
| WO | 2005/118665 | A1 | 12/2005 |
| WO | 2006/037538 | A1 | 4/2006 |

OTHER PUBLICATIONS

Cray Valley Photocure Resins Product Guide, pp. 8-9 "Oligo(Ether) and Monomer Acrylates" L'Industrie a Messages, Paris Oct. 2003.

\* cited by examiner

*Primary Examiner* — Angela C Scott
(74) *Attorney, Agent, or Firm* — Allen J. Moss; Squire Patton Boggs (US) LLP

(57) ABSTRACT

The present invention provides a cross-linkable functionalized isocyanate composition comprising (1) a functionalized isocyanate product being the reaction product of (i) an isocyanate component having at least two isocyanate groups and (ii) an ethylenically unsaturated component having at least one functional group that is reactive with an isocyanate group of the isocyanate component and at least one ethylenically unsaturated group, wherein the isocyanate component and the ethylenically unsaturated component are selected so that the functionalized isocyanate product has at least three ethylenically unsaturated groups, (2) a monomer component comprising a cross-linking monomer having at least two ethylenically unsaturated groups, and (3) a reinforcing component. Embodiments of the invention being resins that have been cross-linked and cured demonstrate high heat deflection temperature and excellent tensile and flexural properties.

23 Claims, No Drawings

THERMOSETTING RESIN COMPOSITION

The present invention relates generally to a thermosetting resin composition and a cured resin derived from such a composition. In particular, the present invention is concerned with reinforced thermosetting resins based on a functionalised isocyanate monomer for use in making shaped articles including laminates, and methods of making such resins and articles.

Thermosetting resins curable by a free radical copolymerisation process are well known. Examples of such are unsaturated polyester resins and so-called vinyl ester resins. In both cases, a polymer containing ethylenically unsaturated groups such as fumarate or methacrylate is dissolved in a copolymerisable monomer such as styrene. Such resins are liquid under normal conditions but, when treated with a source of free radicals such as an organic peroxide initiator, will rapidly crosslink to form a hard thermoset plastic mass. Such a process is used in the production of, for example, coatings, adhesives and shaped articles.

An important property of a thermoset plastic to be used in the production of shaped articles is its heat deflection temperature (sometimes termed 'heat distortion temperature' and often abbreviated by those skilled in the art to 'HDT'), which is a measure of the stiffness of the crosslinked resin at elevated temperature.

HDT is one of a range of mechanical, thermal and chemical material properties which must be demonstrated by a resin composition if it is to be suitable for a specific application.

HDT can be increased by raising the number of ethylenically unsaturated groups in either or both of the polymer and copolymerisable monomer(s) making up the resin, giving a higher crosslink density in the finished article. However, a higher crosslink density also makes the finished article more brittle, such that its mechanical performance is impaired. In particular, articles made from high crosslink density resins exhibit low strain to failure in either tension or bending and therefore low strength.

Consequently, it has not proved possible to extend the use of thermoset plastics into many applications in which the finished article will be exposed to high temperatures (e.g. in excess of 200° C.) and significant mechanical stress, because of, on the one hand, the comparatively low heat deflection temperatures offered by traditional thermosetting resins and, on the other hand, the inferior mechanical properties resulting from the use of resins designed to give a high crosslink density in order to attain a high HDT.

Furthermore, the mechanical properties of such curable resins when combined with a reinforcing component such as a fibre, is difficult to predict. For example, a resin having a desirable HDT may, when reinforced, possess insufficient tensile and flexural strength to make it useful for forming shaped articles, particularly if those articles are to be subjected to significant loads.

Consequently, there remains a need within the art for thermosetting resins with HDTs above 200° C., which are both curable, as is usual with such products, by a free radical copolymerisation process and which can be used to produce reinforced articles having good mechanical properties. In particular, there remains a need for thermosetting resins that exhibit a range of desirable tensile and flexural properties (in particular, tensile and flexural strength, modulus and strain to failure) that would enable them to be used as a substitute for traditional materials such as metals.

SUMMARY OF THE INVENTION

Surprisingly, the present inventor has found that the dual requirement for high HDT and good tensile and mechanical properties can be achieved by a reinforced functionalised isocyanate resin comprising the reaction product of an ethylenically unsaturated functionalised isocyanate and a cross-linking monomer.

At its most general, the present invention proposes that such a reinforced cross-linked thermosetting resin can be made from an ethylenically unsaturated functionalised isocyanate product copolymerised with a suitable cross-linking monomer, wherein the functionalised isocyanate product has at least 3 ethylenically unsaturated groups.

Without wishing to be bound by theory, the present inventors believe that the provision of at least 3 ethylenically unsaturated groups on each isocyanate monomer produces a functionalised isocyanate monomer that reacts not only with the cross-linking agent but also with other similarly functionalised isocyanates to form a network of functionalised isocyanates. The resultant cross-linked resin not only has a high HDT, but is particularly suitable for reinforcement and, when reinforced, demonstrates excellent tensile and flexural properties.

The ethylenically unsaturated groups are preferably provided by an acrylate component or an allyl component, and most preferably by a combination of acrylate and allyl components as discussed below.

As also discussed below, examples of such tri- or higher functionalised isocyanate compositions, when cross-linked and reinforced, provide a resin that is highly suitable for use in making shaped articles, having high HDT and excellent tensile and flexural properties.

The present invention is concerned with cross-linkable composition, functionalised isocyanate products for use in such compositions, kits comprising such compositions and cross-linked resins made from such compositions.

Furthermore, the present invention is concerned with processes for making such compositions, resins and articles, as well as the use of such compositions in those processes.

In a first aspect of the invention, there is provided a cross-linkable functionalised isocyanate composition comprising
(1) a functionalised isocyanate product being the reaction product of
    an isocyanate component having at least two isocyanate groups; and
    an ethylenically unsaturated component having
        at least one functional group that is reactive with an isocyanate group of the isocyanate component, and
        at least one ethylenically unsaturated group,
wherein the isocyanate component and the ethylenically unsaturated component are selected so that the functionalised isocyanate product has at least three ethylenically unsaturated groups,
(2) a monomer component comprising a cross-linking monomer having at least two ethylenically unsaturated groups, and
(3) a reinforcing component.

Such a composition can be cross-linked, typically by addition of an initiator, as discussed below.

The composition contains a tri- or higher ethylenically unsaturated functionalised isocyanate component which the inventor has found to be particularly effective as the monomer in a resin which demonstrates high HDT and excellent tensile and flexural properties. Such a composition, being a combination of a specific class of functionalised isocyanate, a cross-linking monomer and a reinforcing component, reduces or avoids the drawbacks associated with known reinforced resins, namely that high HDT can only be achieved at the expense of a brittle resin, i.e. poor tensile and flexural properties. The cross-linkable composition is particularly suitable for use in forming shaped articles, particularly for use as a substitute for traditional materials such as metals.

It is particularly preferred that the isocyanate component and the ethylenically unsaturated component are selected so that the functionalised isocyanate product has at least four, more preferably at least six ethylenically unsaturated groups.

Preferably the ethylenically unsaturated component is an acrylate component and the ethylenically unsaturated group is a (meth)acrylate group. Preferred acrylate components are discussed below.

As used herein, the term "(meth)acrylate(s)" includes acrylate(s) and methacrylate(s), as is well known in the art.

Alternatively or additionally, the ethylenically unsaturated component is an allyl component and the ethylenically unsaturated group is the vinyl group of the allyl group. Preferred allyl components include allylic functionalised alcohols, for example allyl alcohol, propoxylated allyl alcohol and trimethylolpropane diallyl ether (TMPDE). Di- and higher allyls are preferred, TMPDE being particularly preferred.

It is also preferred that a combination of acrylate component and allyl component are used. Particularly preferred are combinations of the preferred acrylate and allyl components mentioned herein.

Indeed, it is most preferred that the ethylenically unsaturated component is a mixture of acrylate component and allyl component. The present inventor has found that the combination of acrylate and allyl components provides not only high HDT but also good mechanical properties. Thus, suitably, the resultant product comprises urethane groups derived from acrylate and allyl components.

In particularly preferred arrangements the amounts of acrylate and allyl components are selected so that the acrylate component is used in a greater amount than the allyl component, based on moles of respective acrylate and allyl components.

Throughout the rest of this specification, the present invention is discussed generally in terms of the ethylenically unsaturated component being an acrylate (the reaction product with the isocyanate component being referred to as a urethane acrylate). Nevertheless, the preferred features associated with such acrylate components preferably also apply, mutatis mutandi, to other ethylenically unsaturated components, including allyl components and especially allylic functionalised alcohols which are mentioned above (in the case of the use of allyl components, the reaction product with the isocyanate component is an allyl urethane). Furthermore, any such reference to an acrylate component also applies to a combination of acrylate and allyl components, as is particularly preferred (in which case the reaction product formed from reaction with the isocyanate component is an allyl urethane acrylate).

Thus, preferably, the composition of this aspect comprises
(1) a urethane acrylate product being the reaction product of
 an isocyanate component having at least two isocyanate groups; and
 an acrylate component having
  at least one functional group that is reactive with an isocyanate group of the isocyanate component, and
  at least one (meth)acrylate group,
wherein the isocyanate component and the acrylate component are selected so that the urethane acrylate product has at least three (meth)acrylate groups,
(2) a monomer component comprising a cross-linking monomer having at least two ethylenically unsaturated groups, and
(3) a reinforcing component.

Preferably, the tri- or higher (meth)acrylate functionalised isocyanate component is formed from either the reaction of a diisocyanate with a di- or higher functionalised (meth)acrylate, or the reaction product of a tri- or higher isocyanate with a mono- or higher (meth)acrylate.

Thus, preferably, the urethane acrylate product is the reaction product of
(A) a diisocyanate and
 an acrylate component having at least one functional group that is reactive with an isocyanate group of the isocyanate component and at least two (meth)acrylate groups; or
(B) a tri- or higher isocyanate and
 an acrylate component having at least one functional group that is reactive with an isocyanate group of the isocyanate component and at least one (meth)acrylate group.

It is particularly preferred that the urethane acrylate product is the reaction product of a tri- or higher isocyanate and an acrylate component having at least one functional group that is reactive with an isocyanate group of the isocyanate component and at least one (meth)acrylate group.

As discussed with respect to the Examples below, the (meth)acrylate functionalisation of a tri- or higher isocyanate provides a monomer that imparts an excellent combination of HDT and tensile and flexural properties. In particular, it is thought that such a combination imparts high tensile strength, tensile modulus and strain to failure to the cured resin, whilst also avoiding an overly brittle structure, such that good flexural properties are also achieved.

As noted above, the ethylenically unsaturated component is most preferably provided by a mixture of acrylate and allyl components, and so the preferred features discussed above also apply to compositions where the ethylenically unsaturated component is such a mixture.

Preferably the isocyanate component is a non-aromatic isocyanate. Preferably the isocyanate component is at least one selected from an aliphatic isocyanate, a cyclic isocyanate and a hydrogenated aromatic isocyanate.

More generally, suitable isocyanates include at least one selected from monomeric hexamethylene diisocyanate (HDI); isophorone diisocyanate (IPDI), trimers of HDI and IPDI; hydrogenated diphenylmethane diisocyanate (hydrogenated MDI), hydrogenated toluene diisocyanate (hydrogenated TDI), hydrogenated tetramethyxylylene diisocyanate (hydrogenated TMXDI) and hydrogenated polymethylene polyphenyl diisocyanate (hydrogenated PAPI), as well as modified versions of these including dimers, trimers, uretidione-modified, urea-modified, urethane-modified and allophanate-modified diisocyanates.

Preferably the isocyanate component is a triisocyanate.

Suitably, the isocyanate component is a trimer or a biuret-modified diisocyanate.

In particular, the isocyanate component is preferably selected from a trimer or biuret of isophorone diisocyanate, a trimer or biuret of hexamethylene diisocyanate, and mixtures thereof.

Trimers are particularly preferred and the isocyanate component is preferably selected from a trimer of isophorone diisocyanate, a trimer of hexamethylene diisocyanate, and mixtures thereof.

The most preferred trimer is a trimer of isophorone diisocyanate (t-IPDI).

The isocyanate component may comprise a so called "chain extended" isocyanate. A chain extended isocyanate is an isocyanate formed from the reaction of a di or higher isocyanate (X) with an "extender" molecule (Y), which extender molecule comprises two or more functional groups that are reactive with an isocyanate group, to form an isocyanate terminated molecule of the form X—Y—X.

A greater or lesser degree of chain extension, i.e. higher or lower values of n in X—(Y—X)$_n$, can be achieved by controlling the relative amounts of isocyanate (X) and extender molecule (Y). Suitably n is in the range 1 to 5. It is particularly preferred that n=1.

Thus, suitably the di or higher isocyanate (X) is reacted in excess with the extender molecule (Y), suitably at least a 2:1 excess based on moles of isocyanate (X) and extender molecule (Y).

Suitably the di or higher isocyanate (X) is selected from the isocyanates discussed herein.

Preferably, the extender molecule is a diol (i.e. the functional group reactive with the isocyanate is a hydroxyl). The diol may be a simple diol, for example ethylene glycol, propylene glycol, 1,3-butanediol, neopentyl glycol, 1,6-hexanediol and such-like. Alternatively, the diol may be an ether diol (such as diethylene glycol or dipropylene glycol), a polyether diol (for instance, a polyethylene or polypropylene glycol), a polycaprolactone diol or a polyester diol. Preferred diols are ethylene glycol, diethylene glycol, dipropylene glycol, polyethylene glycol and polypropylene glycol. Particularly preferred diols are ethylene glycol and polyethylene glycol. In the case of polyethylene glycol, preferably the Mw is less than 1000, more preferably less than 500 and even more preferably less than 300. A Mw in the range 150 to 250 is particularly preferred.

A particularly preferred chain extended isocyanate is formed from the reaction of trimer of isophorone diisocyanate (t-IPDI) and polyethylene glycol.

Suitably, in the reaction between the isocyanate component and the acrylate component (to form the urethane acrylate product (1)) there is no reaction between two or more isocyanate components. For example, suitably there is no reaction between diisocyanates to form dimmeric or trimeric products of the diisocyanate. Similarly, there is suitably no reaction between two or more urethane acrylate products during the formation of such a urethane acrylate product (1). Naturally, the same applies when an allyl component is used, on its own or in combination with an acrylate component.

As for the acrylate component (indeed, for an ethylenically unsaturated component, including an allyl component), preferably the functional group that is reactive with the isocyanate group of the isocyanate is a hydroxyl-functional group.

In the case where the acrylate component comprises a mono(meth)acrylate group, preferably the acrylate component comprises a mono-hydroxy mono-(meth)acrylate. Particularly preferred mono(meth)acrylates include at least one selected from hydroxyethyl (meth)acrylate, hydroxypropyl (meth)acrylate, hydroxybutyl (meth)acrylate, 2-hydroxyethyl acrylate and the like.

Whilst an acrylate component having a mono(meth)acrylate group or more than one (meth)acrylate group can be used with tri- or higher isocyanates, preferably the acrylate component includes at least two (meth)acrylate groups. This assists in the formation of a suitable cross-linked network in the finished resin and contributes to the combination of excellent tensile and flexural properties, as well as a high HDT.

Indeed, it is generally preferred that the acrylate component comprises a di(meth)acrylate. More preferably, the acrylate component is at least one selected from trimethylolpropane di(meth)acrylate, glycerol di(meth)acrylate, pentaerythritol tri(meth)acrylate and dipenaerythritol penta (meth)acrylate.

Most preferably, the acrylate component comprises glycerol dimethacrylate (GDMA).

Thus, it is particularly preferred that the isocyanate component is a triisocyanate, preferably t-IPDI and the acrylate component is a di(meth)acrylate, preferably GDMA.

In the case of the ethylenically unsaturated component being allyl, a particularly preferred combination is triisocyanate, preferably t-IPDI, and diallyl, preferably trimethylolpropane diallyl ether.

A further preferred arrangement is where the ethylenically unsaturated component is a combination of acrylate and allyl, preferably diisocyanate and diallyl. Particularly preferred is a combination of GDMA and TMPDE.

The present inventor has found that the properties of the final resin are improved if, as is preferred, the acrylate component is present in stoichiometric excess with respect to the isocyanate groups of the isocyanate component. That is, the number of functional groups reactive with the isocyanate group of the isocyanate component (suitably hydroxyl) is greater than the number of isocyanate groups.

In particular, the hydroxy-acrylate component is preferably present in at least 3%, preferably at least 5%, equivalence excess (equivalents of hydroxyl-functionality over isocyanate functionality) with respect to the isocyanate groups of the isocyanate component. Even better results may be achieved if the hydroxy-acrylate component is present in at least 20% equivalence excess, more preferably at least 35% equivalence excess, with respect to the isocyanate groups of the isocyanate component.

In the preferred case of the ethylenically unsaturated component being a combination of acrylate and allyl components, the stoichiometric excess referred to above is suitably a stoichiometric excess of the total amount of acrylate and allyl components with respect to the isocyanate groups of the isocyanate.

It is particularly preferred that, in the case of a combination of acrylate and allyl components, the acrylate component is present in stoichiometric or sub-stoichiometric amounts. The sub-stoichiometric amounts are especially preferred. The present inventor has found that providing the acrylate component in an amount that is stoichiometrically deficient with respect to the isocyanate groups of the isocyanate component assists in producing a functionalised isocyanate product that comprises urethane groups derived from both acrylate and allyl components.

It is also preferred that the allyl component is also present in sub-stoichiometric amounts with respect to the isocyanate groups of the isocyanate component.

As discussed below, when making the functionalised isocyanate product by reaction of the isocyanate component with the acrylate and allyl components, it is preferred that the isocyanate and acrylate components are reacted first (with the acrylate component suitably being used in a sub-stoichiometric amount), followed by reaction with the allyl component. Whilst each of the acrylate and allyl components are reacted in stoichiometric deficient amounts with respect to the total number of isocyanate groups in the isocyanate component, the overall amount of allyl and acrylate component may in fact be in stoichiometric excess. In such embodiments where there is an overall stoichiometric excess of acrylate and allyl component with respect to the isocyanate component, it is preferred that the stoichiometric excess comprises an excess of allyl component.

In such cases, suitably the stoichiometric excess is no more than 15%, preferably no more than 10% and suitably no more than 5%.

Where a combination of acrylate component and allyl component are used to functionalise the isocyanate component, it is preferred that the relative amounts of acrylate component and allyl component are selected so that at least half, preferably more than half, of the isocyanate groups are functionalised with the acrylate component.

In the particularly preferred case where the isocyanate component has 3 isocyanate groups, it is preferred that the relative amounts of acrylate component and allyl component are selected so that 1.5-2.9 of the isocyanate groups are reacted with acrylate and 0.1-1.5 of the isocyanate groups are reacted with allyl, more preferably 1.75-2.75 with acrylate and 0.25-1.25 with allyl, and most preferably 2.0-2.5 with acrylate and 0.5-1.0 with allyl.

Preferably the cross-linking monomer of the monomer component (2) comprises a di- or higher vinyl, acrylate or allyl monomer. Suitable cross-linking monomers include at least one selected from divinyl benzene (DVB); a hydroxyl-functional (meth)acrylate as discussed above in relation to the acrylate component, such as glycerol di(meth)acrylate, trimethylolpropane di(meth)acrylate, pentaerythritol tri(meth)acrylate and dipenaerythritol penta(meth)acrylate; di and polyfunctional (meth)acrylates that do not have a hydroxyl group, such as ethylene glycol di(meth)acrylate, diethylene glycol di(meth)acrylate, dipropylene glycol di(meth)acrylate 1,3-butanediol di(meth)acrylate, 1,4-butanediol di(meth)acrylate, 1,6-hexanediol di(meth)acrylate, trimethylolpropane tri(meth)acrylate and pentaerythritol tetra(meth)acrylate; and ethoxylated or propoxylated versions of the above mentioned (meth)acrylates, such as ethoxylated trimethylolpropane tri(meth)acrylate, ethoxylated pentaerythritol tetra(meth)acrylate, ethoxylated bisphenol A di(meth)acrylate, propoxylated trimethylolpropane tri(meth)acrylate), propoxylated glycerol tri(meth)acrylate and the like.

The cross-linking monomer can also include at least one selected from diallyl phthalate and pentaerythritol tetra-allyl ether.

Suitably at least some of the cross-linking monomer can be provided by the stoichiometric excess of acrylate component. Similarly, in the case of the stoichiometric excess being provided by the combination of acrylate and allyl components, at least some of the cross-linking monomer can be provided by the excess of the acrylate and allyl components.

Suitably the monomer component (2) also includes at least one reactive diluent monomer, which reactive diluent monomer comprises at least one ethylenically unsaturated group. Such a reactive diluent monomer can be copolymerised with the urethane acrylate product using free radical polymerisation. Such a reactive diluent monomer is preferably not a cross-linking monomer.

Preferred examples of a reactive diluent monomer comprising one ethylenically unsaturated group include styrene, methylstyrene, ethyl styrene, halogenated styrene and vinyl toluene. Such monomers can be added to the reactive composition comprising the isocyanate component and the acrylate component (i.e. prior to reaction), for example to lower viscosity during the reaction to form the urethane acrylate product.

Suitably at least some of the reactive diluent monomer can be provided by the stoichiometric excess of acrylate component. Similarly, in the case of the stoichiometric excess being provided by the combination of acrylate and allyl components, at least some of the reactive diluent monomer can be provided by the excess of the acrylate and allyl components.

Suitably, the monomer component comprises more than one monomer. Preferably the monomer component comprises at least one reactive diluent monomer having one ethylenically unsaturated bond and at least one cross-linking monomer having two or more ethylenically unsaturated bonds.

Preferably, the monomer component comprises styrene and at least one of divinyl benzene and an acrylate having at least two (meth)acrylate groups. Preferably all three such monomers are included. Suitably the monomer component comprises an allyl having at least two allyl groups in addition to or as an alternative to the acrylate.

In a particularly preferred composition, the monomer component comprises GDMA, styrene and DVB. Preferably the monomer component substantially consists of, more preferably consists essentially of, and yet more preferably consists of GDMA, styrene and DVB.

In a yet further particularly preferred composition, the monomer component comprises TMPDE, 1,3-butanediol dimethacrylate, styrene and DVB. Preferably the monomer component substantially consists of, more preferably consists essentially of, and yet more preferably consists of TMPDE, 1,3-butanediol dimethacrylate (BGDMA), styrene and DVB.

The present inventor has also found that in the case where the monomer component comprises a combination of monomers, the weight ratio of the respective monomers can influence the properties of the final resin. Thus, in the preferred composition wherein the monomer component comprises glycerol dimethacrylate, styrene and divinyl benzene, it is particularly preferred that the weight ratio of the three monomers is about 2:3:3, which has been found to contribute to a high HDT as well as excellent tensile and flexural properties. Another preferred weight ratio of the three monomers is about 3:3.5:3.5.

In the preferred embodiments wherein the monomer component comprises TMPDE and BGDMA in place of GDMA, the ratios are the same as those discussed above (with TMPDE and BGDMA taking the place of GDMA).

More generally, in respect of the relative amounts of the reactive diluent monomer and the cross-linking monomer, the ratio, in terms of wt % based on the total weight of reactive diluent monomer and cross-linking monomer, of the reactive diluent monomer to the cross-linking monomer (including any such reactive diluent monomer and/or cross-linking monomer provided by the stoichiometric excess of the acrylate component or combination of acrylate and allyl components) is preferably in the range 10:90 to 50:50. More preferably the ratio is in the range 25:75 to 45:55. Most preferably the ratio is in the range 35:65 to 40:60.

In the case of a composition comprising a di(meth)acrylate (preferably glycerol dimethacrylate) as the acrylate component and divinyl benzene as a cross-linking monomer, the ratio is preferably in the range 25:75 to 45:55, more preferably the ratio is in the range 35:65 to 40:60. A particularly preferred ratio is about 37:63. Another preferred ratio is about 35:65.

Suitably at least 10 wt % of the total weight of reactive diluent monomer and cross-linking monomer is provided by the stoichiometric excess of the acrylate component, more preferably at least 15 wt %, more preferably at least 20 wt %, most preferably at least 25 wt %. It is particularly preferred that about 26 wt % is provided by the stoichiometric excess of the acrylate component. As noted above, the stoichiometric excess can be provided by the combination of aryl and allyl components.

Thus, as noted above, in the case of a composition comprising glycerol dimethacrylate, styrene and divinyl benzene, the respective wt % ratios are about 25:37.5:37.5. Also preferred are wt % ratios of about 30:35:35.

Similarly, the relative amounts of the urethane acrylate product (which, as noted above, can also be an allyl urethane or allyl urethane acrylate) and the monomer component (cross-linking monomer and reactive diluent monomer) may also influence the tensile and flexural properties of the cross-linked resin. Preferably the ratio of urethane acrylate product to monomer component, in terms of wt % based on the total weight of urethane acrylate product and monomer component, is in the range 80:20 to 20:80. More preferably the ratio is in the range 70:30 to 30:70, more preferably 65:35 to 35:65 and most preferably in the range 60:40 to 40:60.

The reinforcing component preferably comprises fibre or other elongate material such as strands, ribbons, wires, whiskers or tubes.

Preferably the fibres or other elongate material are composed of inorganic material. Examples of suitable inorganic fibres include glass fibres and boron fibres.

Alternatively or additionally, organic fibres can be used, such as carbon fibres and Kevlar (sometimes known as Aramid) fibres.

Also suitable are natural fibres such as cellulosic fibres, including hemp fibre, sisal fibre, jute fibre, kenaf fibre and paper fibres.

Preferably the fibres are chopped fibres. Preferably the fibres are non-woven fibres, for example a non-woven mat.

Examples of so-called whiskers include graphite whiskers, silicon carbide whiskers, silicon nitride and the like.

Appropriate wires include metal wires, particularly high-strength steel wires and tungsten wires.

Carbon nanotubes are a preferred reinforcing component in the form of a tube.

However, the reinforcing component can also be in other forms. For example, glass can also be incorporated as glass flakes. Particulate fillers may also be used as reinforcement, examples being clay particles and nano-scale particles such as nano-silica, nano-titania and nano-silver.

Preferably the reinforcing component comprises fibres. More preferably the reinforcing component comprises glass fibres, most preferably chopped glass fibres in the form of chopped strand mat. The said chopped strand mat may be of either the emulsion-bound or of the powder-bound type.

Preferably the reinforcing component is present in an amount of at least 10 wt % or more, based on the total weight of the final reinforced resin. More preferably, the reinforcing component is present in an amount of at least 20 wt %, more preferably at least 30 wt % and most preferably at least 35 wt %.

In a particularly preferred composition, the reinforcing component is glass fibre and is present in an amount of at least 30 wt %, more preferably at least 35 wt %.

In addition to the reinforcing component, the urethane acrylate composition may also include fillers and/or other conventional additives.

Preferably the composition also includes an inhibitor, to prevent unwanted or premature free radical reaction. Suitable inhibitors include quinones. Particularly preferred examples include 1,4 naphthaquinone, 1,4 benzoquinone, hydroquinone and mixtures thereof.

As discussed above, cured resins of the present invention, including those formed from the compositions of the present invention preferably have an HDT of at least 200° C., as measured according to the protocol described in the Examples. More preferably they have an HDT of at least 210° C. and most preferably at least 220° C.

In practice, a cross-linkable composition adapted to be used with a reinforcing component may be supplied to end users who then add the desired reinforcing component. Such a composition nevertheless contains the combination of functional isocyanate product and cross-linking monomer as discussed above.

In a further aspect, the present invention provides a cross-linkable functionalised isocyanate composition comprising
(1) a functionalised isocyanate product being the reaction product of
    an isocyanate component having at least two isocyanate groups; and
    an ethylenically unsaturated component having
        at least one functional group that is reactive with an isocyanate group of the isocyanate component, and
        at least one ethylenically unsaturated group,
    wherein the isocyanate component and the ethylenically unsaturated component are selected so that the functionalised isocyanate product has at least three ethylenically unsaturated groups, and
(2) a monomer component comprising a cross-linking monomer having at least two ethylenically unsaturated groups.

As discussed above, the ethylenically unsaturated isocyanate is preferably provided by an allyl component, more preferably by an acrylate component, and most preferably a mixture of acrylate and allyl components.

Thus, in a preferred part of this aspect, the present invention provides a urethane acrylate composition comprising
(1) a urethane acrylate product being the reaction product of
    an isocyanate component having at least two isocyanate groups; and
    an acrylate component having at least one functional group that is reactive with an isocyanate group of the isocyanate component, and at least one (meth)acrylate group,
    wherein the isocyanate component and the acrylate component are selected so that the urethane acrylate product has at least three (meth)acrylate groups, and
(2) a monomer component that is copolymerisable with the urethane acrylate product, wherein the monomer component includes at least one cross-linking monomer having at least two ethylenically unsaturated groups.

In a related aspect, the present invention provides an allyl urethane acrylate composition comprising
(1) an allyl urethane acrylate product being the reaction product of
    an isocyanate component having at least two isocyanate groups; and
    (i) an acrylate component having at least one functional group that is reactive with an isocyanate group of the isocyanate component, and at least one (meth)acrylate group, and
    (ii) an allyl component having at least one functional group that is reactive with an isocyanate group of the isocyanate component, and at least one allyl group,
    wherein the isocyanate component and the acrylate and allyl components are selected so that the allyl urethane acrylate product has at least three ethylenically unsaturated groups, and
(2) a monomer component that is copolymerisable with the urethane acrylate product, wherein the monomer component includes at least one cross-linking monomer having at least two ethylenically unsaturated groups.

The optional and preferred features of the first and any of the other aspects herein may also apply, singly or in any combination, to these aspects.

As discussed above, the present invention is also concerned with an isocyanate functionalised product for use in a composition of the present invention. A particularly preferred functionalised isocyanate is one based on the reaction product of a trimer of isophorone diisocyanate and a di- or higher (meth)acrylate. Furthermore, that a stoichiometric excess of the (meth)acrylate can bring about improved properties in the final resin.

Thus, in a further aspect, the present invention provides a functionalised isocyanate product being the reaction product of
- a trimer of isophorone diisocyanate; and
- an ethylenically unsaturated component having at least one functional group that is reactive with an isocyanate group of the isocyanate component, and at least two ethylenically unsaturated groups, wherein the functionalised isocyanate product is derived from a reaction mixture in which the ethylenically unsaturated component is in stoichiometric excess with respect to the isocyanate groups of the trimer.

In a preferred part of this aspect, the present invention provides a urethane acrylate product being the reaction product of
- a trimer of isophorone diisocyanate; and
- an acrylate component having at least one functional group that is reactive with an isocyanate group of the isocyanate component, and at least two (meth)acrylate groups, wherein the urethane acrylate product is derived from a reaction mixture in which the acrylate component is in stoichiometric excess with respect to the isocyanate groups of the trimer.

Preferably the acrylate component is glycerol dimethacrylate.

The optional and preferred features of the first and any of the other aspects herein may also apply, singly or in any combination, to the present aspect.

The present invention is also concerned with kits comprising the various components needed in order to cure/cross-link the compositions.

Thus, in a further aspect, the present invention provides a kit comprising
(A) a functionalised isocyanate composition comprising
(1) a functionalised isocyanate product being the reaction product of
- an isocyanate component having at least two isocyanate groups; and
- an ethylenically unsaturated component having at least one functional group that is reactive with an isocyanate group of the isocyanate component, and at least one ethylenically unsaturated group, wherein the isocyanate component and the ethylenically unsaturated component are selected so that the functionalised isocyanate product has at least three ethylenically unsaturated groups, and
(2) a monomer component comprising a cross-linking monomer having at least two ethylenically unsaturated groups; and
(B) a reinforcing component.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides a kit comprising
(A) a urethane acrylate composition comprising
(1) a urethane acrylate product being the reaction product of
- an isocyanate component having at least two isocyanate groups; and
- an acrylate component having at least one functional group that is reactive with an isocyanate group of the isocyanate component, and at least one (meth)acrylate group,
wherein the isocyanate component and the acrylate component are selected so that the urethane acrylate product has at least three (meth)acrylate groups, and
(2) a monomer component comprising a cross-linking monomer having at least two ethylenically unsaturated groups; and
(B) a reinforcing component.

In a related aspect, the present invention provides a kit comprising
(A) an allyl urethane acrylate composition comprising
(1) an allyl urethane acrylate product being the reaction product of
- an isocyanate component having at least two isocyanate groups; and
- (i) an acrylate component having at least one functional group that is reactive with an isocyanate group of the isocyanate component, and at least one (meth)acrylate group, and
- (ii) an allyl component having at least one functional group that is reactive with an isocyanate group of the isocyanate component, and at least one allyl group,
wherein the isocyanate component and the acrylate and allyl components are selected so that the allyl urethane acrylate product has at least three ethylenically unsaturated groups, and
(2) a monomer component comprising a cross-linking monomer having at least two ethylenically unsaturated groups; and
(B) a reinforcing component.

Suitably the kit further comprises (C) an initiator for initiating cross-linking of the urethane acrylate product. Thus, the initiator is a free radical initiator, i.e. it provides a source of free radicals to initiate free radical polymerisation.

Preferably the initiator includes at least one selected from a peroxide, a metal salt and an amine.

Preferably the peroxide is selected from methyl ethyl ketone peroxide, t-butyl perbenzoate (for example, available as Trigonox C from Akzo Nobel).

Furthermore, benzoyl peroxide or cyclohexanone peroxide can be used with an amine accelerator such as dimethyl or diethyl aniline.

Preferably the metal salt is cobalt octoate.

Preferably the initiator comprises both methyl ethyl ketone peroxide and cobalt octoate.

The optional and preferred features of the first and any of the other aspects herein may also apply, singly or in any combination, to these aspects.

In a particularly preferred kit, the isocyanate component is a trimer of isophorone diisocyanate, the acrylate component comprises glycerol dimethacrylate, the monomer component comprises divinyl benzene, glycerol dimethacrylate and styrene, and the reinforcing component comprises glass fibres.

The present invention is also concerned with cross-linked resins, i.e. cross-linked resins of the compositions described above.

Thus, in a further aspect, the present invention provides a cross-linked resin comprising
(A) the cross-linked reaction product of
(1) a functionalised isocyanate product being the reaction product of
- an isocyanate component having at least two isocyanate groups; and
- an ethylenically unsaturated component having at least one functional group that is reactive with an isocyanate group of the isocyanate component, and at least one ethylenically unsaturated group, wherein the isocyanate component and the ethylenically unsaturated component are selected so that the functionalised isocyanate product has at least three ethylenically unsaturated groups, and
(2) a monomer component comprising a cross-linking monomer having at least two ethylenically unsaturated groups; and
(B) a reinforcing component.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides a cross-linked resin comprising
(A) the cross-linked reaction product of
(1) a urethane acrylate product being the reaction product of
   an isocyanate component having at least two isocyanate groups; and
   an acrylate component having at least one functional group that is reactive with an isocyanate group of the isocyanate component, and at least one (meth)acrylate group,
wherein the isocyanate component and the acrylate component are selected so that the urethane acrylate product has at least three (meth)acrylate groups, and
(2) a monomer component comprising a cross-linking monomer having at least two ethylenically unsaturated groups; and
(B) a reinforcing component.

In a related aspect, the present invention provides a cross-linked resin comprising
(A) the cross-linked reaction product of
(1) an allyl urethane acrylate product being the reaction product of
   an isocyanate component having at least two isocyanate groups; and
   (i) an acrylate component having at least one functional group that is reactive with an isocyanate group of the isocyanate component, and at least one (meth)acrylate group, and
   (ii) an allyl component having at least one functional group that is reactive with an isocyanate group of the isocyanate component, and at least one allyl group,
wherein the isocyanate component and the acrylate and allyl components are selected so that the allyl urethane acrylate product has at least three ethylenically unsaturated groups, and
(2) a monomer component comprising a cross-linking monomer having at least two ethylenically unsaturated groups; and
(B) a reinforcing component.

The optional and preferred features of the first and any of the other aspects herein may also apply, singly or in any combination, to these aspects.

In a particularly preferred cross-linked resin, the isocyanate component is a trimer of isophorone diisocyanate, the acrylate component comprises glycerol dimethacrylate, the monomer component comprises divinyl benzene, glycerol dimethacrylate and styrene, and the reinforcing component comprises glass fibres.

Preferably the cross-linked resin is in the form of a shaped article.

The present invention is also concerned with composite articles, particularly laminates, made from the reinforced compositions described herein.

Thus, in a further aspect, the present invention provides a composite article comprising at least two layers of polymeric material, wherein at least one of the layers comprises a cross-linked functionalised isocyanate resin, the cross-linked functionalised isocyanate resin being formed from
(A) the cross-linked reaction product of
(1) a functionalised isocyanate product being the reaction product of
   an isocyanate component having at least two isocyanate groups; and
   an ethylenically unsaturated component having at least one functional group that is reactive with an isocyanate group of the isocyanate component, and at least one ethylenically unsaturated group, wherein the isocyanate component and the ethylenically unsaturated component are selected so that the functionalised isocyanate product has at least three ethylenically unsaturated groups, and
(2) a monomer component comprising a cross-linking monomer having at least two ethylenically unsaturated groups; and
(B) a reinforcing component.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides a composite article comprising at least two layers of polymeric material, wherein at least one of the layers comprises a cross-linked urethane acrylate resin, the cross-linked urethane acrylate resin being formed from
(A) the cross-linked reaction product of
(1) a urethane acrylate product being the reaction product of
   an isocyanate component having at least two isocyanate groups; and
   an acrylate component having at least one functional group that is reactive with an isocyanate group of the isocyanate component, and at least one (meth)acrylate group,
wherein the isocyanate component and the acrylate component are selected so that the urethane acrylate product has at least three (meth)acrylate groups, and
(2) a monomer component comprising a cross-linking monomer having at least two ethylenically unsaturated groups; and
(B) a reinforcing component.

In a related aspect the present invention provides a composite article comprising at least two layers of polymeric material,
wherein at least one of the layers comprises a cross-linked allyl urethane acrylate resin, the cross-linked allyl urethane acrylate resin being formed from
(A) the cross-linked reaction product of
(1) an allyl urethane acrylate product being the reaction product of
   an isocyanate component having at least two isocyanate groups; and
   (i) an acrylate component having at least one functional group that is reactive with an isocyanate group of the isocyanate component, and at least one (meth)acrylate group, and
   (ii) an allyl component having at least one functional group that is reactive with an isocyanate group of the isocyanate component, and at least one allyl group,
wherein the isocyanate component and the acrylate and allyl components are selected so that the allyl urethane acrylate product has at least three ethylenically unsaturated groups, and
(2) a monomer component comprising a cross-linking monomer having at least two ethylenically unsaturated groups; and
(B) a reinforcing component.

The optional and preferred features of the first and any of the other aspects herein may also apply, singly or in any combination, to these aspects.

Preferably the composite article is a laminate.

Preferably the composition of the second layer of the composite article is different from the first layer.

Nevertheless, preferably, the second layer also comprises a cross-linked urethane acrylate or cross-linked allyl urethane acrylate formed from reaction product (A). Suitably, the second layer does not include a reinforcing component.

Preferably the composite article comprises at least 3 layers, more preferably at least 4 layers.

Each layer may itself comprise more than one layer. For example a glass fibre reinforced layer may comprise two or more layers of glass fibre reinforced resin. Such an arrangement may be produced by arranging the reinforcing component, e.g. glass fibres, in a series of layers and then cross-linking the resin. Alternatively, multiple layers may be built up by applying and then cross-linking each layer.

The present invention is also concerned with processes for making the products, compositions, resins and composite articles described herein.

Thus, in a further aspect, the present invention provides a process of making a cross-linkable functionalised isocyanate composition, the method comprising the steps of (1) forming a functionalised isocyanate product from the reaction of
- an isocyanate component having at least two isocyanate groups; and
- an ethylenically unsaturated component having at least one functional group that is reactive with an isocyanate group of the isocyanate component, and at least one ethylenically unsaturated group, wherein the isocyanate component and the ethylenically unsaturated component are selected so that the functionalised isocyanate product has at least three ethylenically unsaturated groups;

(2) adding to the reaction product of (1) a monomer component comprising a cross-linking monomer having at least two ethylenically unsaturated groups; and (3) adding a reinforcing component to the mixture of (1) and (2).

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides a process of making a cross-linkable urethane acrylate composition, the method comprising the steps of (1) forming a urethane acrylate product from the reaction of
- an isocyanate component having at least two isocyanate groups; and
- an acrylate component having at least one functional group that is reactive with an isocyanate group of the isocyanate component, and at least one (meth)acrylate group,
wherein the isocyanate component and the acrylate component are selected so that the urethane acrylate product has at least three (meth)acrylate groups;

(2) adding to the reaction product of (1) a monomer component comprising a cross-linking monomer having at least two ethylenically unsaturated groups; and (3) adding a reinforcing component to the mixture of (1) and (2).

In a related aspect, the present invention provides a process of making a cross-linkable allyl urethane acrylate composition, the method comprising the steps of (1) forming an allyl urethane acrylate product from the reaction of
- an isocyanate component having at least two isocyanate groups; and
- (i) an acrylate component having at least one functional group that is reactive with an isocyanate group of the isocyanate component, and at least one (meth)acrylate group, and
- (ii) an allyl component having at least one functional group that is reactive with an isocyanate group of the isocyanate component, and at least one allyl group, wherein the isocyanate component and the acrylate and allyl components are selected so that the allyl urethane acrylate product has at least three ethylenically unsaturated groups, and (2) adding to the reaction product of (1) a monomer component comprising a cross-linking monomer having at least two ethylenically unsaturated groups; and (3) adding a reinforcing component to the mixture of (1) and (2).

The optional and preferred features of the first and any of the other aspects herein may also apply, singly or in any combination, to these aspects.

In embodiments wherein the ethylenically unsaturated component is a combination of acrylate and allyl components, preferably the step of (1) forming an allyl urethane acrylate product comprises reacting the isocyanate component with the acrylate component to form a urethane acrylate and then reacting the urethane acrylate with the allyl component to form the allyl urethane acrylate.

Suitably the acrylate component is used in sub-stoichiometric amounts, as noted above. Preferably the reaction of the isocyanate component with the acrylate component is carried out until the isocyanate content is no less than 2%. In other words, preferably the urethane acrylate product that is subsequently reacted with the allyl component has an isocyanate content of no less than 2%.

As discussed above, the monomer component preferably includes, in addition to the cross-linking monomer, a reactive diluent monomer having at least one ethylenically unsaturated group.

Furthermore, in this aspect, the reactive diluent monomer is suitably added to the reaction mixture of the isocyanate component and the acrylate component (or combination of acrylate and allyl components). In other words it is added to the composition before or during the reaction of the isocyanate component and the acrylate component (or combination of acrylate and allyl components).

Thus, the process preferably includes the additional step of adding monomer component comprising a reactive diluent monomer to the reaction mixture of the isocyanate component and the acrylate component.

It has been found that such a reactive diluent monomer can reduce the viscosity of the reaction mixture, thereby assisting in bringing the reaction closer to completion. Furthermore, the reactive diluent monomer can then be subsequently incorporated into the urethane acrylate polymer by free radical polymerisation, preferably at the same time as the cross-linking monomer reacts to cross-link the urethane acrylate product.

In a particularly preferred process, the isocyanate component is a trimer of isophorone diisocyanate, the acrylate component comprises glycerol dimethacrylate, the monomer component comprises divinyl benzene, glycerol dimethacrylate and styrene, and the reinforcing component comprises glass fibres.

Preferably the styrene is added to the reaction mixture of the trimer of isophorone diisocyanate and the glycerol dimethacrylate.

In particularly preferred embodiments the process comprises the steps of:

(1) reacting t-IPDI with GDMA, the GDMA being used in a sub-stoichiometric amount;

(2) reacting the resultant urethane acrylate product with TMPDE;

(3) adding BGDMA and DVB to the resultant allyl urethane acrylate component; and (4) adding a reinforcing component.

Suitably the reaction steps (1) and (2) take place in the presence of styrene (i.e. preferably step (1) includes providing styrene) which is then itself preferably reacted in a subsequent cross-linking step.

In the case of the ethylenically unsaturated component being an acrylate component (i.e. not a mixture of acrylate and allyl components) it is preferred in some embodiments that the acrylate component is provided in stoichiometric excess with respect to the isocyanate groups of the isocyanate component.

In such cases, the hydroxy-acrylate component is preferably present in at least 5% equivalence excess (equivalents of hydroxyl-functionality over isocyanate functionality) with respect to the isocyanate groups of the isocyanate component. Even better results may be achieved if the hydroxy-acrylate component is present in at least 20% equivalence excess, more preferably at least 35% equivalence excess, with respect to the isocyanate groups of the isocyanate component.

Suitably the isocyanate component and the acrylate component are reacted at a temperature in the range 50° to 100° C., more preferably 70 to 90° C. Most suitably the isocyanate component and the acrylate component are reacted at a temperature in the range 80 to 85° C. Naturally, as explained above, these ranges also apply to embodiments wherein the ethylenically unsaturated component is provided by a mixture of allyl and acrylate components.

Preferably the reaction between the isocyanate component and the acrylate component (or combination of allyl and acrylate components) is continued until the isocyanate content is less than 1%, preferably less than 0.5% (as measured in accordance with the method discussed below in relation to the Examples).

Suitably, the process includes adding a catalyst to catalyse the reaction in step (1), i.e. the reaction between the acrylate component and the isocyanate component.

A preferred catalyst is a metal salt, more preferably a metal carboxylate. Tin catalysts are preferred, especially dibutyltin dilaurate.

In a further related aspect, the present invention also provides the use of a functionalised isocyanate composition as defined herein in a method of making a cross-linkable functionalised isocyanate composition comprising a reinforcing component as defined herein.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides the use of a urethane acrylate composition or an allyl urethane acrylate composition as defined herein in a method of making a cross-linkable urethane acrylate composition or cross-linkable allyl urethane acrylate composition comprising a reinforcing component as defined herein.

The optional and preferred features of the first and any of the other aspects herein may also apply, singly or in any combination, to the present aspect.

As discussed above, the compositions supplied to manufacturers wishing to make a reinforced resin of the present invention may not include the reinforcing component, which can be added subsequently by the manufacturers. Thus, the present invention is also concerned with a process of making a functionalised isocyanate composition which can be used with a reinforcing component.

Thus, in a further aspect, the present invention provides a process of making a functionalised isocyanate composition, the method comprising the steps of (1) forming a functionalised isocyanate product from the reaction of
    an isocyanate component having at least two isocyanate groups; and
    an ethylenically unsaturated component having
        at least one functional group that is reactive with an isocyanate group of the isocyanate component, and
        at least one ethylenically unsaturated group,
wherein the isocyanate component and the ethylenically unsaturated component are selected so that the functionalised isocyanate product has at least three ethylenically unsaturated groups, and
(2) adding to the reaction product of (1) a monomer component comprising a cross-linking monomer having least two ethylenically unsaturated groups.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides a process of making a urethane acrylate composition, the method comprising the steps of
(1) forming a urethane acrylate product from the reaction of
    an isocyanate component having at least two isocyanate groups; and
    an acrylate component having at least one functional group that is reactive with an isocyanate group of the isocyanate component, and at least one (meth)acrylate group,
wherein the isocyanate component and the acrylate component are selected so that the urethane acrylate product has at least three (meth)acrylate groups, and
(2) adding to the reaction mixture or reaction product of (1) a monomer component comprising a cross-linking monomer having least two ethylenically unsaturated groups.

In a related aspect, the present invention provides a process of making an allyl urethane acrylate composition, the method comprising the steps of
(1) forming an allyl urethane acrylate product from the reaction of
    an isocyanate component having at least two isocyanate groups; and
    (i) an acrylate component having at least one functional group that is reactive with an isocyanate group of the isocyanate component, and at least one (meth)acrylate group, and
    (ii) an allyl component having at least one functional group that is reactive with an isocyanate group of the isocyanate component, and at least one allyl group,
wherein the isocyanate component and the acrylate and allyl components are selected so that the allyl urethane acrylate product has at least three ethylenically unsaturated groups, and
(2) adding to the reaction mixture or reaction product of (1) a monomer component comprising a cross-linking monomer having least two ethylenically unsaturated groups.

The optional and preferred features of the first and any of the other aspects herein may also apply, singly or in any combination, to these aspects.

In a particularly preferred process, the isocyanate component is a trimer of isophorone diisocyanate, the acrylate component comprises glycerol dimethacrylate, the monomer component comprises divinyl benzene, glycerol dimethacrylate and styrene, and the reinforcing component comprises glass fibres.

The styrene is preferably added to the reaction mixture of the isocyanate component and the acrylate component.

In a further related aspect, the present invention also provides the use of a functionalised isocyanate composition as defined herein in a method of making a cross-linkable functionalised isocyanate composition as defined herein to which a reinforcing component can be added.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides the use of a urethane acrylate composition or an allyl urethane acrylate composition as defined herein in a method of making a cross-linkable urethane acrylate composition or a cross-linkable allyl urethane acrylate composition as defined herein to which a reinforcing component can be added.

The optional and preferred features of the first and any of the other aspects herein may also apply, singly or in any combination, to the present aspect.

The present invention is also concerned with a process for making a reinforced cross-linked resin.

Thus, in a further aspect, the present invention provides a process of making a reinforced cross-linked functionalised isocyanate resin, the method comprising the steps of (1) forming a functionalised isocyanate product from the reaction of an isocyanate component having at least two isocyanate groups; and an ethylenically unsaturated component having at least one functional group that is reactive with an isocyanate group of the isocyanate component, and at least one ethylenically unsaturated group, wherein the isocyanate component and the ethylenically unsaturated component are selected so that the functionalised isocyanate product has at least three ethylenically unsaturated groups;

(2) adding to the reaction product of (1) a monomer component comprising a cross-linking monomer having at least two ethylenically unsaturated groups;

(3) adding a reinforcing component to the mixture of (1) and (2); and (4) initiating the cross-linking reaction between the monomer component and the functionalised isocyanate product.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides a process of making a reinforced cross-linked resin, the method comprising the steps of (1) forming a urethane acrylate product from the reaction of an isocyanate component having at least two isocyanate groups; and an acrylate component having at least one functional group that is reactive with an isocyanate group of the isocyanate component, and at least one acrylate group, wherein the isocyanate component and the acrylate component are selected so that the urethane acrylate product has at least three acrylate groups;

(2) adding to the reaction product of (1) a monomer component comprising a cross-linking monomer having at least two ethylenically unsaturated groups;

(3) adding a reinforcing component to the mixture of (1) and (2); and (4) initiating the cross-linking reaction between the monomer component and the urethane acrylate product.

In a related aspect, the present invention provides a process of making a reinforced cross-linked resin, the method comprising the steps of (1) forming an allyl urethane acrylate product from the reaction of an isocyanate component having at least two isocyanate groups; and (i) an acrylate component having at least one functional group that is reactive with an isocyanate group of the isocyanate component, and at least one (meth)acrylate group, and (ii) an allyl component having at least one functional group that is reactive with an isocyanate group of the isocyanate component, and at least one allyl group, wherein the isocyanate component and the acrylate and allyl components are selected so that the allyl urethane acrylate product has at least three ethylenically unsaturated groups, and (2) adding to the reaction product of (1) a monomer component comprising a cross-linking monomer having at least two ethylenically unsaturated groups;

(3) adding a reinforcing component to the mixture of (1) and (2); and (4) initiating the cross-linking reaction between the monomer component and the allyl urethane acrylate product.

The optional and preferred features of the first and any of the other aspects herein may also apply, singly or in any combination, to these aspects.

In a particularly preferred process, the isocyanate component is a trimer of isophorone diisocyanate, the acrylate component comprises glycerol dimethacrylate, the monomer component comprises divinyl benzene, glycerol dimethacrylate and styrene, and the reinforcing component comprises glass fibres.

The styrene is preferably added to the reaction mixture of the isocyanate component and the acrylate component.

Preferably the initiator includes methyl ethyl ketone peroxide and cobalt octoate.

Preferably the process includes the additional step (5) curing the resin composition.

Suitably the step of curing the resin includes a curing stage and a post curing stage. Suitably the curing stage occurs at room temperature. A typical duration is 5 to 15 hours. For example, the resin may be left overnight to cure.

The present inventor has found that a post curing step can be beneficial in achieving high HDT and good tensile and flexural properties.

Suitably, the post curing stage comprises heating the resin composition at a temperature above 60° C., preferably above 70° C., more preferably above 75° C. A preferred temperature is about 80° C. Preferably the temperature is no more than 100° C.

Preferably, such post curing at elevated temperature occurs for at least 2 hours, preferably at least 4 hours. A preferred duration is about 5 hours.

Preferably the step of post curing comprises two stages of post curing.

The second stage of post curing is preferably at a temperature above 100° C., preferably above 150° C., more preferably above 180° C. A preferred temperature is about 200° C. Preferably the temperature is no more than 300° C.

The second stage of post curing occurs for at least 1 hours, preferably at least 2 hours. A preferred duration is about 3 hours.

Any combination of these temperatures and durations can be used in a two stage post curing step. However, suitably the first stage post curing is at a lower temperature than the second stage post curing. Suitably post curing during the first stage is for a longer time than the second stage.

In a preferred post curing step, the resin composition is post cured in a first stage at a temperature in the range 60 to 100° C. for about 5 hours, followed by post curing in a second stage at a temperature in the range of 150 to 300° C. for about 3 hours.

In a particularly preferred curing step, the resin composition is cured in a first stage at about 80° C. for about 5 hours, followed by curing in a second stage at about 200° C. for about 3 hours.

The present invention is also concerned with a process for cross-linking a "ready made" composition comprising a functionalised isocyanate product and a cross-linking monomer.

Thus, in a further, related, aspect, the present invention provides a process of making a cross-linked resin, the method comprising the steps of adding (i) a reinforcing component, and (ii) a cross-linking initiator to a composition comprising
(1) a functionalised isocyanate product, which product is the reaction product of
   an isocyanate component having at least two isocyanate groups; and
   an ethylenically unsaturated component having at least one functional group that is reactive with an isocyanate group of the isocyanate component, and at least one ethylenically unsaturated group, wherein the isocyanate component and the ethylenically unsaturated component are selected so that the functionalised isocyanate product has at least three ethylenically unsaturated groups; and
(2) a monomer component comprising a cross-linking agent having at least two ethylenically unsaturated groups.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides a process of making a cross-linked resin, the method comprising the steps of adding (i) a reinforcing component, and (ii) a cross-linking initiator to a composition comprising
(1) a urethane acrylate product, which product is the reaction product of
   an isocyanate component having at least two isocyanate groups; and
   an acrylate component having at least one functional group that is reactive with an isocyanate group of the isocyanate component, and at least one (meth)acrylate group,
wherein the isocyanate component and the acrylate component are selected so that the urethane acrylate product has at least three (meth)acrylate groups; and
(2) a monomer component comprising a cross-linking agent having at least two ethylenically unsaturated groups.

In a related aspect, the present invention provides a process of making a cross-linked resin, the method comprising the steps of adding (i) a reinforcing component, and (ii) a cross-linking initiator to a composition comprising
(1) a urethane acrylate product, which product is the reaction product of
   an isocyanate component having at least two isocyanate groups; and
   (i) an acrylate component having at least one functional group that is reactive with an isocyanate group of the isocyanate component, and at least one (meth)acrylate group, and
   (ii) an allyl component having at least one functional group that is reactive with an isocyanate group of the isocyanate component, and at least one allyl group,
wherein the isocyanate component and the acrylate and allyl components are selected so that the allyl urethane acrylate product has at least three ethylenically unsaturated groups; and
(2) a monomer component comprising a cross-linking agent having at least two ethylenically unsaturated groups.

The optional and preferred features of the first and any of the other aspects herein may also apply, singly or in any combination, to these aspects.

In a particularly preferred process, the isocyanate component is a trimer of isophorone diisocyanate, the acrylate component comprises glycerol dimethacrylate, the monomer component comprises divinyl benzene, glycerol dimethacrylate and styrene, and the reinforcing component comprises glass fibres.

Preferably the styrene is added to the reaction mixture of isocyanate component and acrylate component.

Preferably the initiator includes methyl ethyl ketone peroxide and cobalt octoate.

The present invention is also concerned with a process for making a composite article, preferably a laminate.

Thus, in a further aspect, the present invention provides a process of forming a composite article comprising the steps of
(A) forming a first layer composed of polymeric material, and
(B) forming a second layer comprising a cross-linked reinforced functionalised isocyanate resin formed from the cross-linked reaction product of
(1) a functionalised isocyanate product being the reaction product of
   an isocyanate component having at least two isocyanate groups; and
   an ethylenically unsaturated component having
      at least one functional group that is reactive with an isocyanate group of the isocyanate component, and
      at least one ethylenically unsaturated group,
wherein the isocyanate component and the ethylenically unsaturated component are selected so that the functionalised isocyanate product has at least three ethylenically unsaturated groups, and
(2) a monomer component comprising a cross-linking monomer having at least two ethylenically unsaturated groups, wherein the resin includes a reinforcing component.

As discussed above, the ethylenically unsaturated isocyanate product is preferably provided by an allyl component, more preferably by an acrylate component, and most preferably a mixture of acrylate and allyl components.

Thus, in a preferred part of this aspect, the present invention provides a process of forming a composite article comprising the steps of
(A) forming a first layer of material composed of polymeric material, and
(B) forming a second layer comprising a cross-linked reinforced urethane acrylate resin formed from the cross-linked reaction product of
(1) a urethane acrylate product being the reaction product of
   an isocyanate component having at least two isocyanate groups; and
   an acrylate component having
      at least one functional group that is reactive with an isocyanate group of the isocyanate component, and
      at least one (meth)acrylate group, wherein the isocyanate component and the acrylate component are selected so that the urethane acrylate product has at least three (meth)acrylate groups, and (2) a monomer component comprising a cross-linking monomer having at least two ethylenically unsaturated groups, wherein the resin includes a reinforcing component.

In a related aspect, the present invention provides a process of forming a composite article comprising the steps of (A) forming a first layer of material composed of polymeric material, and (B) forming a second layer comprising a cross-linked reinforced allyl urethane acrylate resin formed from the cross-linked reaction product of (1) an allyl urethane acrylate product being the reaction product of an isocyanate component having at least two isocyanate groups; and (i) an acrylate component having at least one functional group that is reactive with an isocyanate group of the isocyanate component, and at least one (meth)acrylate group, and (ii) an allyl component having at least one functional group that is reactive with an isocyanate group of the isocyanate component, and at least one allyl group, wherein the isocyanate component and the acrylate and allyl components are selected so that the allyl urethane acrylate product has at least three ethylenically unsaturated groups, and (2) a monomer component comprising a cross-linking monomer having at least two ethylenically unsaturated groups, wherein the resin includes a reinforcing component.

Preferably the composite article is a laminate.

Preferably the second layer is formed on or adjacent the first layer.

Preferably the second layer is formed by applying a urethane acrylate composition comprising the urethane acrylate product, the monomer component and the reinforcing component, and initiating the reaction between the urethane acrylate product and the monomer component.

Preferably the composite article is formed in a mold. Preferably steps (A) and/or (B) include forming the respective layers in a mold.

Preferably the composite article is a shaped article.

Each of the aspects previously described may be combined with one, more than one or all of the other aspects and features within each of the aspects may be combined with features from the other aspects. Therefore, in a further aspect, the present invention provides a composition, product, composite article, process or use including one, more than one or all of the previous aspects.

DESCRIPTION OF EMBODIMENTS OF THE INVENTION

Materials and Methods

Vestanat T1890/100 is a proprietary trimer of isophorone diisocyanate available from Degussa GmbH.

Desmodur NZI is a proprietary uretdione-modified blend of the trimers of isophorone diisocyanate and 1,6-diisocyanato hexane, available from Bayer AG.

Desmodur N100 is a proprietary biuret-modified 1,6-diisocyanatohexane available from Bayer AG.

Desmodur N3400 is a proprietary uretdione-modified 1,6-diisocyanatohexane available from Bayer AG.

Fascat 4202HP is a proprietary tin-based reaction catalyst available from Atofina.

Butanox LPT is a proprietary methyl ethyl ketone peroxide available from Akzo Nobel.

Solution Q is a 33% wt solution of hydroquinone in diethylene glycol.

Accelerator G is a solution of cobalt (II) octoate in styrene available from Scott Bader Company Limited, the cobalt concentration being 1% wt.

The isocyanate content of the reaction mixtures described, during processing, is determined by dissolving a small sample of the mixture (0.5-1.5 g) in dry tetrahydrofuran, reacting the residual isocyanate with a metered quantity of di-n-butylamine and back-titrating the unreacted di-n-butylamine with 0.1M hydrochloric acid.

The gel time of the liquid resins described was measured at 25° C. according to BS2782 Part 8 Method 835C (1980) using a Techne gel timer as the mechanised timing device. In this method, 100 g of resin initiated with 2% Accelerator G plus 2% Butanox LPT and maintained at 25° C. whilst the gel time is determined by means of a vertically moving plunger driven by the Techne gel timer.

ICI cone and plate viscosities of the liquid resins were measured at 25° C. using a viscometer manufactured by Research Equipment (London) Limited, fitted with a 19.5 mm cone rotating at 750 rpm.

Heat deflection temperatures were determined according to the method of BS EN ISO 75-2 Method A (1996). In the preparation of the test pieces according to this Method, the liquid resins were cured with 2% wt Accelerator G plus 2% wt Butanox LPT, the cured specimens being left to stand at room temperature overnight before being post-cured for 5 hours at 80° C. followed by 3 hours at 200° C.

Glass reinforced laminates were prepared with four layers of 450 gsm powder-bound chopped strand glass mat (Owens Corning grade M273A), the resin being once again initiated with 2% wt Accelerator G plus 2% wt Butanox LPT before lay-up of the laminates by hand. These laminates were left overnight at room temperature to cure, followed by post-cure for 5 hours at 80° C., then 3 hours at 200° C. Tensile properties of these laminates were measured using the method of BS EN ISO 527-4 (1997). Flexural properties were measured with the method of BS EN ISO 14125 (1998) Method A. (Chopped strand mat being a so-called coarse reinforcement, test specimens of 25 mm width were used, as indicated by the Standard for coarse reinforcements.) Glass contents were determined using the method of EN 60 (1977).

Example 1

Into a 5-liter, lidded round-bottomed flask equipped with reflux condenser, motorised anchor stirrer and temperature probe was charged 1419.11 g of Vestanat 1890/100, 791.13 g of styrene and a mixture of inhibitors consisting of 1.5 g of 1,4-naphthaquinone, 0.375 g of 1,4-benzoquinone and 4.5 g of Solution Q. This mixture was heated, with stirring, to a temperature between 80 and 85° C. 1.2 g of Fascat 4202HP was then added before commencing dropwise addition of 2020.805 g of glycerol dimethacrylate. This addition step lasted 85 minutes, the temperature being maintained between 80 and 85° C. during this time. The reaction is exothermic, so variation of the addition rate is one means by which the maintenance of a steady batch temperature may be achieved. Once the addition was complete, the reaction mixture was stirred at 80-85° C. until the isocyanate content had dropped to 0.37%, which took approximately four hours. Then it was cooled to below 40° C. before addition of 761.38 g of divinylbenzene (63% grade). The product was a liquid resin having a viscosity of 4.5 Poise at 25° C., as measured by ICI cone and plate viscometer, and a gel time of 19.6 minutes.

Example 2

Into a 2-liter, lidded round-bottomed flask equipped with reflux condenser, motorised anchor stirrer and temperature probe was charged 320.224 g of isophorone diisocyanate and a mixture of inhibitors consisting of 0.3 g of 1,4-naphthaquinone, 0.075 g of 1,4-benzoquinone and 0.9 g of Solution Q. This mixture was heated, with stirring, under a gentle flow of air, to a temperature between 80 and 85° C. 0.24 g of Fascat 4202HP was then added before commencing dropwise addition of 678.336 g of glycerol dimethacrylate. This addition step lasted 65 minutes, the temperature being maintained between 80 and 85° C. during this time, variation of the addition rate again being employed to control the exotherm and maintain a steady batch temperature. Once the addition was complete, the reaction mixture was stirred at 80-85° C. until the isocyanate content had dropped to 0.8%. This took approximately 6½ hours, during which time the mixture became very viscous. 20 g of styrene was therefore added to keep the mixture sufficiently fluid to stir. After reaching the required isocyanate content, the product was cooled and discharged to a container.

400 g of this product was warmed to 50° C. to render it workable before being mixed with styrene (116.4 g), followed by glycerol dimethacrylate (101.8 g) and 63% grade divinylbenzene (109.1 g) to give a liquid resin of viscosity 0.7 Poise (ICI cone and plate) and a gel time of 17.0 minutes, both measured at 25° C.

Example 3

Into a 1-liter, lidded round-bottomed flask equipped with reflux condenser, motorised anchor stirrer and temperature probe was charged 252.312 g of Desmodur N3400, 158.263 g of styrene and a mixture of inhibitors consisting of 0.3 g of 1,4-naphthaquinone, 0.038 g of 1,4-benzoquinone and 0.9 g of Solution Q. This mixture was heated, with stirring, to a temperature between 80 and 85° C. 0.24 g of Fascat 4202HP was then added before commencing dropwise addition of 435.671 g of glycerol dimethacrylate. This addition step lasted 50 minutes, the temperature being maintained between 80 and 85° C. during this time. Once the addition was complete, the reaction mixture was stirred at 80-85° C. until the isocyanate content had dropped to 0.18%, which took approximately two hours. Then it was cooled to below 40° C. before addition of 152.276 g of divinylbenzene (63% grade).

The product liquid resin had a viscosity of 1.0 Poise at 25° C. and a gel time of 5.7 minutes at the same temperature.

Example 4

Into a 1-liter, lidded round-bottomed flask equipped with reflux condenser, motorised anchor stirrer and temperature probe was charged 263.881 g of Desmodur NZI, 158.263 g of styrene and a mixture of inhibitors consisting of 0.3 g of 1,4-naphthaquinone, 0.038 g of 1,4-benzoquinone and 0.9 g of Solution Q. This mixture was heated, with stirring, to a temperature between 80 and 85° C. 0.24 g of Fascat 4202HP was then added before commencing dropwise addition of 424.102 g of glycerol dimethacrylate. This addition step lasted 70 minutes, the temperature being maintained between 80 and 85° C. during this time. Once the addition was complete, the reaction mixture was stirred at 80-85° C. until the isocyanate content had dropped to 0.28%, which took approximately three hours. Then it was cooled to below 40° C. before addition of 152.276 g of divinylbenzene (63% grade).

The product liquid resin had a viscosity of 1.4 Poise at 25° C. and a gel time at that temperature of 6.8 minutes.

Example 5

Into a 1-liter, lidded round-bottomed flask equipped with reflux condenser, motorised anchor stirrer and temperature probe was charged 250.859 g of Desmodur N100, 158.263 g of styrene and a mixture of inhibitors consisting of 0.3 g of 1,4-naphthaquinone, 0.038 g of 1,4-benzoquinone and 0.9 g of Solution Q. This mixture was heated, with stirring, to a temperature between 80 and 85° C. 0.24 g of Fascat 4202HP was then added before commencing dropwise addition of 437.094 g of glycerol dimethacrylate. This addition step lasted 50 minutes, the temperature being maintained between 80 and 85° C. during this time. Once the addition was complete, the reaction mixture was stirred at 80-85° C. until the isocyanate content had dropped to 0.06%, which took approximately two hours. Then it was cooled to below 40° C. before addition of 152.276 g of divinylbenzene (63% grade).

The product liquid resin had a cone and plate viscosity of 4.5 Poise at 25° C. and a gel time at that temperature of 5.6 minutes.

Example 6

Into a 2-liter, lidded round-bottomed flask equipped with reflux condenser, motorised anchor stirrer and temperature probe was charged 479.42 g of Vestanat 1890/100, 196.97 g of styrene and a mixture of inhibitors consisting of 0.600 g of 1,4-naphthaquinone, 0.150 g of 1,4-benzoquinone and 1.8 g of Solution Q. This mixture was heated, with stirring, to a temperature between 80 and 85° C. 0.48 g of Fascat 4202HP was then added, followed by 20.41 g of ethylene glycol. The resulting exothermic reaction raised the temperature to 120° C., necessitating cooling back to below 85° C. The isocyanate content was then found to be 7.4%. Following this, glycerol dimethacrylate (800.17 g) was fed dropwise into the flask over a period of 80 minutes, maintaining a temperature in the range 80-85° C. during this addition. Once the addition was complete, the reaction mixture was stirred at 80-85° C. until the isocyanate content had dropped to 0.14%, which took approximately two hours. Then the mixture was cooled to below 40° C. before addition of 500.0 g of divinylbenzene (63% grade). The product was a liquid resin having a viscosity of 3.3 Poise at 25° C., as measured by ICI cone and plate viscometer, and a gel time of 37.4 minutes.

Example 7

Into a 1-liter, lidded round-bottomed flask equipped with reflux condenser, motorised anchor stirrer and temperature probe was charged 226.83 g of Vestanat 1890/100, 98.49 g of styrene and a mixture of inhibitors consisting of 0.300 g of 1,4-naphthaquinone, 0.075 g of 1,4-benzoquinone and 0.9 g of Solution Q. This mixture was heated, with stirring, to a temperature between 80 and 85° C. 0.24 g of Fascat 4202HP was then added, followed by 31.15 g of polyethylene glycol (average molecular weight 200) over a 10-minute period. The resulting reaction was less vigorous than that of Further Example F1, so the mixture was held at 80-85° C. for 30 minutes in order to reduce the isocyanate content to the required level, in this case 6.8%. Following this, glycerol dimethacrylate (392.02 g) was fed dropwise into the flask over a period of 80 minutes, maintaining a temperature in the range 80-85° C. during this addition. Once the addition was complete, the reaction mixture was stirred at 80-85° C. until the isocyanate content had dropped to 0.14%, which took approximately two hours. Then the mixture was cooled to below 40° C. before addition of 250.0 g of divinylbenzene (63% grade). The product was a liquid resin having a viscosity of 4.0 Poise at 25° C., as measured by ICI cone and plate viscometer, and a gel time of 27.7 minutes.

Example 8

Into a 1-liter, lidded round-bottomed flask equipped with reflux condenser, motorised anchor stirrer and temperature probe was charged 282.66 g of Vestanat 1890/100, 158.23 g of styrene and a mixture of inhibitors consisting of 0.300 g of 1,4-naphthaquinone, 0.075 g of 1,4-benzoquinone and 0.9 g of Solution Q. This mixture was heated, with stirring, to a temperature between 80 and 85° C. and 0.24 g of Fascat 4202HP added. Following this, glycerol dimethacrylate (176.98 g) was fed dropwise into the flask over a period of 20 minutes, maintaining a temperature in the range 80-85° C. during this addition. Once the addition was complete, the reaction mixture was stirred at 80-85° C. until the isocyanate content had dropped to 2.53%, which took approximately one hour. Trimethylolpropane diallyl ether, 80% grade, (90.74 g) was then fed dropwise into the flask over a period of 25 minutes, continuing to maintain a temperature between 80 and 85° C. After a further 4¼ hours at this temperature, the isocyanate content had reduced to 0.56%. Then the mixture was cooled to below 40° C. before addition of 137.60 g of 1,3-butanediol dimethacrylate and 152.28 g of divinylbenzene (63% grade). The product was a liquid resin having a viscosity of 2.5 Poise at 25° C., as measured by ICI cone and plate viscometer, and a gel time of 23.1 minutes.

Comparative Example C1

Into a 1-liter, lidded round-bottomed flask equipped with reflux condenser, motorised anchor stirrer and temperature probe was charged 265.618 g of isophorone diisocyanate, 158.263 g of styrene and a mixture of inhibitors consisting of 0.3 g of 1,4-naphthaquinone, 0.075 g of 1,4-benzoquinone and 0.9 g of Solution Q. This mixture was heated, with stirring, to a temperature between 80 and 85° C. 0.24 g of Fascat 4202HP was then added before commencing dropwise addition of 284.762 g of 2-hydroxyethylacrylate. This addition step lasted 35 minutes, the temperature being maintained between 80 and 85° C. during this time. Once the addition was complete, the reaction mixture was stirred at 80-85° C. until the isocyanate content had dropped to 0.07%, which took approximately three hours. Then it was cooled to below 40° C. before addition of 137.806 g of glycerol dimethacrylate and 152.036 g of divinylbenzene (63% grade).

The product liquid resin had a viscosity of 0.7 Poise at 25° C., and a gel time of 27.3 minutes.

Comparative Example C2

Propylene glycol (40.0 g), diethylene glycol (160.0 g), neopentyl glycol (824.0 g), maleic anhydride (648.0 g) and phthalic anhydride (508.0 g) were all charged to a 5-liter round-bottomed flask. This was then lidded and equipped with a heat-jacketed fractionating column (jacket maintained at 103-104° C.) topped with distillation head and condenser, thermocouple temperature probe, motorised anchor stirrer and nitrogen gas inlet. The contents of the flask were heated, with stirring, bringing the temperature up to 210° C. as fast as possible whilst keeping the temperature of the distillate evolved (measured by a thermocouple mounted in the distillation head) below 102° C. The reaction was continued for 9 hours, the flask temperature not being allowed to rise above 210° C. and the distillation head temperature not being allowed to rise above 102° C. The reaction mixture was periodically sampled for acid value determination (by titration with 0.1M KOH solution) and melt viscosity by ICI cone and plate viscometer. At a melt viscosity of 58 Poise at 100° C., a vacuum of 25"Hg was applied to the flask and the reaction continued to a melt viscosity of 75 Poise at 100° C., at which point the acid value was 27.5 mg KOH per gram of sample.

The polymer was cooled, 0.12 g of mono-tert-butylhydroquinone added at 180° C. and then dissolved in 2000.0 g of ethylene glycol dimethacrylate. The unsaturated polyester resin thus obtained had a viscosity (ICI cone and plate) of 13 Poise at 25° C.

Comparative Example C3

This is Crystic VE676, an epoxy vinyl ester resin commercially available from Scott Bader Company Limited.

Comparative Example C4

This is Crystic 199, an isophthalic polyester resin commercially available from Scott Bader Company Limited.

Comparative Example C5

This is Crystic 198, an orthophthalic polyester resin commercially available from Scott Bader Company Limited.

Table I shows the heat deflection temperatures of these various resins after the cure/post-cure treatment described earlier.

TABLE I

| EXAMPLE | HDT (° C.) |
| --- | --- |
| 1 | 237 |
| 2 | 252 |
| 3 | 244 |
| 4 | 239 |
| 5 | 225 |
| 6 | 246 |
| 7 | 241 |
| 8 | 216 |
| C1 | 161 |
| C2 | 190 |
| C3 | 101 |
| C4 | 126 |
| C5 | 109 |

Table II shows the tensile and flexural properties of the reinforced laminates prepared and tested, along with their glass contents.

TABLE II

| | EXAMPLE | | | | | | | | |
|---|---|---|---|---|---|---|---|---|---|
| | 1 | 2 | 6 | 8 | C1 | C2 | C3 | C4 | C5 |
| Glass content (% wt) | 38.5 | 39.0 | 31.9 | 35.2 | 37.0 | 32.5 | 36.8 | 33.9 | 36.6 |
| Tensile Properties | | | | | | | | | |
| Strength (MPA) | 121.6 | 111.7 | 91.8 | 100.7 | 129.5 | 110.9 | 149.2 | 116.5 | 110.9 |
| Modulus (MPA) | 10636 | 8491 | 7830 | 8580 | 10599 | 8515 | 10186 | 9907 | 9274 |
| Strain to Failure (%) | 2.16 | 2.38 | 2.26 | 2.36 | 2.01 | 1.84 | 2.05 | 1.90 | 1.83 |
| Flexural Properties | | | | | | | | | |
| Strength (MPA) | 234.7 | 250.6 | 157.7 | 167.7 | 270.0 | 187.4 | 257.5 | 227.2 | 219.4 |
| Modulus (MPA) | 7604 | 7902 | 7230 | 7160 | 7336 | 5516 | 7987 | 8316 | 7396 |
| Strain to Failure (%) | 3.92 | 3.81 | 3.82 | 4.00 | 3.66 | 3.84 | 3.35 | 3.05 | 3.28 |

It can be seen from the results in Tables 1 and 2 that the urethane acrylate and allyl urethane compositions of the present invention provide not only a high HDT but also retain good tensile and flexural properties. In particular, all of the Examples demonstrate high HDT as well as good flexural modulus and tensile and flexural strain to failure.

Indeed, in some embodiments, excellent tensile and flexural properties, being superior to those of the comparative examples are achieved. In contrast, the urethane acrylate composition of Comparative Example 1 (a urethane acrylate product having only two isocyanate groups) and the polyester compositions of Comparative Examples 3 to 5 all have much lower HDTs, making them unsuitable for many applications. The polyester resin of Comparative Example 2 has a better HDT than Comparative Example 1, but the flexural properties, in particular the flexural strength and modulus are too low for this composition to be useful.

Furthermore, the results of Example 2 and Comparative Example 1 show that, for the same isocyanate component (IPDI), a change in the acrylate component from mono(meth) acrylate to di(meth)acrylate, and thereby producing a functionalised isocyanate having four, rather than two, ethylenically unsaturated groups surprisingly produces a very substantial increase in HDT without compromising tensile and flexural properties.

Example 6 demonstrates that a functionalised isocyanate composition derived from a chain extended isocyanate (ethylene glycol extended t-IPDI) provides high HDT as well as useful mechanical properties. In related tests, Example 7 also demonstrated good mechanical properties.

Example 8 shows that a combination of acrylate and allyl as the ethylenically unsaturated component is particularly effective in achieving high HDT without compromising tensile and flexural properties.

Thus, embodiments of the present invention provide a combination of both high MDT and useful tensile and flexural properties.

What is claimed is:

1. A cross-linked resin comprising:
   (A) the cross-linked reaction product of:
   (1) a functionalised isocyanate product being the reaction product of:
      an isocyanate component having at least two isocyanate groups; and
      an ethylenically unsaturated component having at least one functional group that is reactive with an isocyanate group of the isocyanate component, wherein:
      the isocyanate component and the ethylenically unsaturated component are selected so that the functionalised isocyanate product has at least three ethylenically unsaturated groups, and
   (2) a monomer component comprising a cross-linking monomer having at least two ethylenically unsaturated groups, and at least one reactive diluent monomer which comprises one ethylenically unsaturated group, and
   (B) a reinforcing component; wherein:
   (i) the mixture of (A) and (B) has been cured at room temperature;
   (ii) the cured mixture of step (i) has been post-cured at a temperature of above 60° C. and no more than 100° C. for at least 2 hours; and
   (iii) the post-cured mixture of step (ii) has been additionally post-cured at a temperature above 150° C. and no more than 300° C. for at least 1 hour.

2. A cross-linked resin according to claim 1, wherein the ethylenically unsaturated component is selected from (i) an acrylate component (ii) combinations of an acrylate component and an allyl component, and (iii) an allyl component.

3. A cross-linked resin according to claim 1, wherein the isocyanate component is selected from at least one of the following (i) to (iv):
   (i) a non-aromatic isocyanate;
   (ii) at least one selected from monomeric hexamethylene diisocyanate (HDI); isophorone diisocyanate (IPDI), trimers of HDI and IPDI; hydrogenated diphenylmethane diisocyanate (hydrogenated MDI), hydrogenated toluene diisocyanate (hydrogenated TDI), hydrogenated tetramethyxylylene diisocyanate (hydrogenated TMXDI), hydrogenated polymethylene polyphenyl diisocyanate (hydrogenated PAPI); dimers and trimers of diisocyanates, and uretidione-modified, urea-modified, urethane-modified and allophanate-modified diisocyanates;
(iii) a trimer or a biuret-modified diisocyanate; and
(iv) a trimer or biuret of isophorone diisocyanate, a trimer or biuret of hexamethylene diisocyanate, and mixtures thereof.

4. A cross-linked resin according to claim 1, wherein the ethylenically unsaturated component is selected from at least one of the following (i) to (iv):
(i) an ethylenically unsaturated component including at least two ethylenically unsaturated groups selected from (meth)acrylate groups, allyl groups and combinations thereof; (ii) a di(meth)acrylate, a diallyl and combinations thereof; (iii) at least one selected from trimethylolpropane di(meth)acrylate, glycerol di(meth)acrylate, pentaerythritol tri(meth)acrylate and dipentaerythritol penta(meth)acrylate, allyl alcohol, propoxylated allyl alcohol, diallyl phthalate, pentaerythritol tetra-allyl ether and trimethylolpropane diallyl ether; and
(iv) wherein the ethylenically unsaturated component comprises one or both of glycerol dimethacrylate and trimethylolpropane diallyl ether.

5. A cross-linked resin according to claim 1, wherein the ethylenically unsaturated component has a hydroxyl functional group for reaction with an isocyanate group of the isocyanate component and the ethylenically unsaturated component is present in stoichiometric excess of hydroxyl functionality equivalents over isocyanate functionality equivalents of the isocyanate component.

6. The cross-linked resin of claim 5, wherein the stoichiometric excess of hydroxyl functionality equivalents over isocyanate functionality equivalents is at least 3%.

7. The cross-linked resin of claim 5, wherein the stoichiometric excess of hydroxyl functionality equivalents over isocyanate functionality equivalents is at least 5%.

8. The cross-linked resin of claim 5, wherein the stoichiometric excess of hydroxyl functionality equivalents over isocyanate functionality equivalents is at least 20%.

9. The cross-linked resin of claim 5, wherein the monomer component (2) comprises styrene and at least one of divinyl benzene, an acrylate having at least two (meth)acrylate groups and an allyl having at least two allyl groups.

10. The cross-linked resin of claim 9, wherein the monomer component (2) comprises glycerol dimethacrylate, styrene and divinyl benzene.

11. The cross-linked resin of claim 9, wherein the monomer component (2) comprises trimethylolpropane diallyl ether, 1,3-butanediol dimethacrylate and divinyl benzene.

12. The cross-linked resin of claim 5, wherein at least 10 wt % of the total weight of the reactive diluent monomer and the cross-linking monomer is provided by the stoichiometric excess of ethylenically unsaturated component.

13. The cross-linked resin of claim 5, wherein at least 25 wt % of the total weight of the reactive diluent monomer and the cross-linking monomer is provided by the stoichiometric excess of ethylenically unsaturated component.

14. A cross-linked resin according to claim 1, wherein the cross-linking monomer is selected from one of the following (i) to (iii):
(i) at least one selected from a di- or higher vinyl, a di- or higher acrylate and a di- or higher allyl monomer;
(ii) at least one selected from divinyl benzene; a hydroxyl-functional (meth)acrylate, glycerol di(meth)acrylate, trimethylolpropane di(meth)acrylate, pentaerythritol tri(meth)acrylate and dipentaerythritol penta(meth)acrylate; di and polyfunctional (meth)acrylates that do not have a hydroxyl group, ethylene glycol di(meth)acrylate, diethylene glycol di(meth)acrylate, dipropylene glycol di(meth)acrylate 1,3-butanediol di(meth)acrylate, 1,4-butanediol di(meth)acrylate, 1,6-hexanediol di(meth)acrylate, trimethylolpropane tri(meth)acrylate and pentaerythritol tetra(meth)acrylate; and ethoxylated or propoxylated versions of the above mentioned (meth)acrylates, ethoxylated trimethylolpropane tri(meth)acrylate, ethoxylated pentaerythritol tetra(meth)acrylate, ethoxylated bisphenol A di(meth)acrylate, propoxylated trimethylolpropane tri(meth)acrylate), and propoxylated glycerol tri(meth)acrylate;
(iii) at least one selected from diallyl phthalate, pentaerythritol tetra-allyl ether and trimethylolpropane diallyl ether.

15. A cross-linked resin according to claim 1, wherein the ratio, in terms of wt % based on the total weight of reactive diluent monomer and cross-linking monomer, of the reactive diluent monomer to the cross-linking monomer is in the range 10:90 to 50:50.

16. The cross-linked resin according to claim 15, wherein the ratio, in terms of wt % based on the total weight of reactive diluent monomer and cross-linking monomer, of the reactive diluent monomer to the cross-linking monomer is in the range 25:75 to 45:55.

17. A cross-linked resin according to claim 1, wherein the ratio of functionalised isocyanate product (1) to monomer component (2), in terms of wt % based on the total weight of functionalised isocyanate product and monomer component, is in the range 80:20 to 20:80.

18. The cross-linked resin according to claim 17, wherein the ratio of functionalised isocyanate product (1) to monomer component (2), in terms of wt % based on the total weight of functionalised isocyanate product and monomer component, is in the range 65:35 to 35:65.

19. A cross-linked resin according to claim 1, wherein the reinforcing component comprises at least one selected from fibres, strands, ribbons, wires, whiskers and tubes.

20. The cross-linked resin according to claim 19, wherein the reinforcing component is composed of inorganic material.

21. A cross-linked resin comprising a cross-linked reaction product of a functionalized isocyanate product (1) of claim 1, which comprises an isocyanate component selected from a trimer or biuret of isophorone diisocyanate, a trimer or biuret of hexamethylene diisocyanate, and mixtures thereof; and an ethylenically unsaturated component which includes at least two ethylenically unsaturated groups selected from (meth)acrylate groups, allyl groups and combinations thereof, and a monomer component (2) of claim 1, which comprises a cross-linking monomer having at least two ethylenically unsaturated groups and at least one reactive diluent monomer selected from styrene, methyl styrene, ethyl styrene, halogenated styrene and vinyl toluene.

22. The cross-linked resin of claim 1, wherein the reactive diluent monomer is selected from the group consisting of styrene, methylstyrene, ethyl styrene, halogenated styrene and vinyl toluene.

23. A shaped article comprising the cross-linked resin according to claim 1.

* * * * *